US 7,450,826 B2

(12) United States Patent
Lasorsa et al.

(10) Patent No.: US 7,450,826 B2
(45) Date of Patent: Nov. 11, 2008

(54) MEDIA PROGRAM WITH SELECTABLE SUB-SEGMENTS

(75) Inventors: Matt Lasorsa, La Canada, CA (US); Michael Mulvihill, Santa Monica, CA (US); Steve Einhorn, New York, NY (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1229 days.

(21) Appl. No.: 10/213,474

(22) Filed: Aug. 6, 2002

(65) Prior Publication Data

US 2003/0068161 A1 Apr. 10, 2003

Related U.S. Application Data

(60) Provisional application No. 60/328,079, filed on Oct. 9, 2001.

(51) Int. Cl.
*H04N 5/76* (2006.01)
*H04N 7/00* (2006.01)
*H04N 5/00* (2006.01)

(52) U.S. Cl. ........................................ 386/125; 386/95

(58) Field of Classification Search ................... 386/95, 386/111, 125
See application file for complete search history.

(56) References Cited

U.S. PATENT DOCUMENTS

| 5,692,212 A | 11/1997 | Roach |
| 5,737,552 A | 4/1998 | Lavallee et al. |
| 5,931,908 A | 8/1999 | Gerba et al. |
| 5,999,172 A | 12/1999 | Roach |
| 6,580,870 B1 * | 6/2003 | Kanazawa et al. ............ 386/95 |
| 6,698,020 B1 * | 2/2004 | Zigmond et al. ............. 725/34 |

* cited by examiner

*Primary Examiner*—Thai Tran
*Assistant Examiner*—Nigar Chowdhury
(74) *Attorney, Agent, or Firm*—Connolly Bove Lodge & Hutz LLP; Jonathan A. Jaech

(57) ABSTRACT

A media program for play on a media player to produce an audio-visual stream perceivable by a user is disclosed. The media program comprises a primary program configured for streaming play on the media player. The primary program is divisible into a continuous sequence of segments defining a timeline. The media program also includes a plurality of sub-segments separate from the primary program. Each of the sub-segments is configured for streaming play on the media player. The media program also includes a plurality of links (indicators or signals) in the primary program. Each link is configured to be played for a predetermined period of the timeline and not at other periods of the timeline. The media program is configured to cause the media player to interrupt the primary program and play a predetermined one of the plurality of sub-segments when a predetermined interruption command of the media player is activated by the user while a link associated with the predetermined one of the plurality of sub-segments is being played. Two or more of the plurality of links may be configured to be played simultaneously during the primary program, each associated with a different one of the plurality of sub-segments. Each of the plurality of links may include information descriptive of a sub-segment associated with the each link, such as a brief written description that may be configured to appear in the black bar of a letterbox display. Methods and systems for producing and playing the media program are also disclosed.

35 Claims, 2 Drawing Sheets

MEDIA PROGRAM WITH SELECTABLE SUB-SEGMENTS

CROSS-REFERENCE TO RELATED APPLICATION

This application claims priority pursuant to 35 U.S.C. § 119(e) to U.S. Provisional Application No. 60/328,079, filed Oct. 9, 2001, which application is specifically incorporated herein, in its entirety, by reference.

BACKGROUND OF THE INVENTION

1. Field of the Invention

The present invention relates to methods and systems for producing and playing media programs, and more particularly to a media program with selectable sub-segments.

2. Description of Related Art

The growth in new forms of digital media has led to numerous opportunities to change the method by which audio-visual and like productions are produced and played. Prior to the rise of digital media, analog media programs typically consisted of a continuous stream of audio-visual information sequentially recorded in a medium such as a photographic film or magnetic tape. To play such analog programs, the recording medium is sequentially scanned by a reading and/or projection device to recreate the recorded program in the intended display format, such as on a movie or television screen. All the elements of the recorded program are played in sequence according to the timing and sequence of the original recording. Analog media playing devices may possess relatively limited functions for altering the recorded timing and sequence of a program. For example, video cassette recorders (VCR's) typically have functions for altering a program timeline that are limited to functions such as pause (freeze-frame), fast-forward, and reverse.

Certain digital media standards, however, provide for expanded capabilities with respect to the sequence and timing of programs. For example, expanded features such as branching, multiple camera angles, parental control, video menus, and interactivity are supported by the DVD-Video standard available from the DVD Forum (www.dvdforum.org). Other digital media standards exist. In general, digital media standards support at least a degree of interactivity and control sufficient to permit control of the sequence and timing of selected media segments or frames during playback. In particular, the DVD-Video standard has become prevalent, and media products that include the expanded features listed above are commonly available based on the DVD-Video standard. Such features, however, do not exhaust the possibilities within the DVD-Video standard or other existing or prospective standards. It is desirable to provide additional features to increase consumer interest in media products such as DVD-Video discs, thereby inducing consumers to purchase such products in greater numbers and at more favorable prices.

SUMMARY OF THE INVENTION

The present invention provides additional features for increasing consumer interest in a recorded media product. In particular, the invention provides a method and system for producing or playing a media program with selectable sub-segments. The invention is particularly suitable for implementation within the DVD-Video standard, and may therefore be used with special-purpose media players such as DVD video players.

The selectable sub-segments are accessed using selectable links that appear at predetermined times and for predetermined periods during play of the primary media program. According to an embodiment of the invention, the selectable links are presented in the form of text-based prompts. Graphical icons have been used for similar purposes in the past, but text-based prompts offer numerous advantages over icons. Text-based prompts are used to describe the linked sub-segment, and/or to indicate some other information about the sub-segment. For example, according to an embodiment of the invention, a textual prompt describes and indicates the run-time (duration) of the linked sub-segment. By reviewing the text-based prompt, a viewer may assess the content of the linked sub-segment and decide whether or not to select the segment for viewing. The media player and program are configured such that the viewer may select any desired sub-segment for viewing by performing a viewer operation (e.g., pressing an "enter" button on the media player remote control unit) while the textual link is displayed.

According to another novel embodiment of the invention, multiple selectable links are simultaneously displayed at independently determined times during play of the primary media program. Individual ones of the multiple links may be graphical icons as used in the past, but preferably, text-based prompts are used. The media player is configured so that the viewer may select any one of the multiple links while it is displayed on the screen. A first viewer operation is used to highlight or otherwise indicate individual ones of the links as desired by the viewer. A second viewer operation is then used to select any link while it is indicated (e.g., highlighted) by the viewer, thereby causing a selectable sub-segment associated with the link to play. The use of multiple simultaneous independent links provides for a more complex and richer viewer experience than is possible using only a single link.

The selectable sub-segment of the present invention differs from branching as known in the prior art in that the presence of selectable sub-segments does not alter the storyline of the primary program. In addition, unlike branch selection, a user of the invention is not required to select any sub-segment in order to advance the progress of a program. Instead, the primary program plays normally, and the user is presented with selectable links to sub-segments during the regular program flow. Selection of the links is at the option of the user. Each link is programmed to appear at predetermined times, and for predetermined intervals, during program play. The user may select any given link by performing a predetermined sequence of operations, such as highlighting an icon or subtitle, and then pressing a control button. Selection of a link causes the primary program to be interrupted by a sub-segment associated with the selected link. The sub-segment is then played until finished or otherwise terminated, and then the primary program resumes playing from the point of interruption.

The program content of the sub-segments is virtually unlimited. For some applications of the invention, individual sub-segments may contain content related to various scenes, themes, actors and actresses, dialogue, etc., that are present in the primary program. For example, one sub-segment may contain commentary from a well-known expert concerning an underlying theme of the program; another sub-segment may contain an additional scene or segment that was cut from the primary program, with or without a director's commentary; another sub-segment may contain an actress's comments about a particular scene; another sub-segment may contain a "behind-the-scenes" look at the filming of a scene, and so forth. Such an application may be designed to appeal particularly to serious media consumers who are interested in viewing a program more than once, and in obtaining more information about a program. Such consumers are particularly likely to rent or purchase DVD-discs, and the addition of features according to the invention may create an additional inducement to do so.

It should be appreciated that the invention is not limited to such applications, and is particularly suitable for any application for which it is desirable to support a primary, essentially self-contained program with supplemental information or scenes. For example, a released movie version may be supported by scenes from an "uncut" version; a mystery movie may be supported by additional information about clues or characters; a serial program (such as a soap opera or mini-series) may be supported by scenes from past episodes; an educational or documentary program may be supported by explanatory or expanded commentary; and so forth. Furthermore, while it is generally desirable to make the sub-segments easily accessible to consumers of the media product, in some cases it may be desirable to hide or encode links to sub-segments that are not easily discovered, thereby creating a product with both "mainstream" and "insider" appeal. Thus, the invention provides a method and system of potentially wide applicability in the entertainment market, and that consumers may come to expect and demand with products such as DVD video discs.

In particular, the use of text-based prompts for the links creates an opportunity to provide the viewer with greater convenience and control over the viewing experience. Mere icons that convey limited or no information about the linked sub-segment are generally not preferred, because the user is required to temporarily exit the primary program to determine the content of the linked sub-segment. If the viewer is not interested in the sub-segment, the viewer is left with the feeling of having wasted time and has interrupted the viewing of the primary program for no reason. Using a descriptive prompt as the link enables the viewer to decide in advance whether a particular sub-segment is of interest, without interrupting the primary program.

It should be apparent that the descriptive links, multiple links, and the combination thereof will enable creation of richer and more complex media products. For example, multiple thematic threads carried by different groups of sub-segments may be interwoven with a primary media program. A more specific example of this is a program wherein the primary program tells a story from the perspective of a selected character or narrator, and different threads (groups of sub-segments) supplement the primary program by showing aspects of the story from the perspective of different characters. This richness and complexity may be used to make the media product appeal to a broader, more diverse audience by including different types of sub-segment content with diverse appeal. In the alternative, the media product may be configured for greater depth of appeal to a particular audience. In general, the applications of the invention are limited only by the creativity of writers and producers of media programs. In recognition of these benefits of the invention, a DVD industry award was recently awarded to its inventors.

A more complete understanding of the media program with selectable sub-segments will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a media program with selectable sub-segments, that is particularly suitable for implementation in digital formats such as DVD-video. As used herein, media program means a discrete information set including at least one primary program for continuous play. A primary program is a portion of a media program that creates a defined continuous dynamic output, such as a motion picture or video, when played in an appropriate media player. For example, in DVD formats, primary programs are sometimes referred to as a "main feature" or a "featured presentation." As used herein, primary program does not refer to information for generating merely static displays of information, such as still photographs or web pages.

A segment is a portion of a media program and is of relatively short duration compared to a primary program. Like a primary program, a segment also creates a defined continuous output when played, and not merely a static display of information. Sub-segment refers to an independent segment of a media program that is separate from the primary program, and is not used to refer to a portion of a segment.

A link is a portion of a media program that creates an audible, visible, or both audible and visible indicator during a defined interval of a primary program. A link in the instant context should be distinguished from hyperlink or link as used in computer networking contexts. In a networking context, a link or hyperlink contains an address for linked information. In the context of a self-contained media program, a link need not contain an address (although it may), and principally serves as an indicator that an associated sub-segment may be accessed during the interval of a primary program for which the link is displayed. A link may be a graphical icon or a textual prompt. Although it is usually preferably to use descriptive text in link, the invention is not limited thereby particularly when multiple simultaneous links are used.

The foregoing definitions are not intended to limit the scope of the invention, but to clarify terms that are well understood by persons having ordinary skill in the art. It should be appreciated that the defined terms may have other meanings to such persons of ordinary skill in the art. These and other terms are used in the detailed description that follows.

Figure 1:
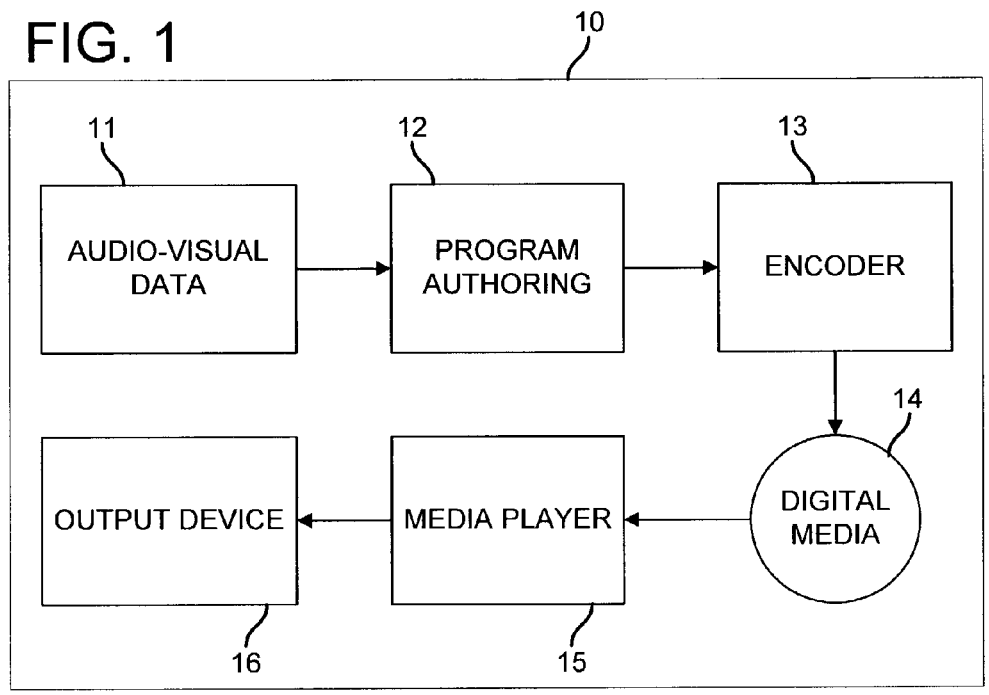
FIG. 1 is a block diagram of a system for producing and playing a media program with selectable sub-segments.

Referring to FIG. 1, a system 10 for producing and playing a media program according to the invention is depicted. System 10 comprises a collection of raw audio-visual data 11, which may be in various digital formats. Data 11 may be obtained directly from digital input devices, such as digital video cameras, or may be obtained by digitizing analog data. The data 11 is typically organized into discrete segments, each of which bears a unique identifier. Data 11 serves as input data for program authoring system 12. The authoring system may be any suitable system known in the art. For example, software for suitable authoring systems is available from Sonic Solutions of Novato, Calif. (www.sonic.com). Authoring software is preferably run on a general purpose computer equipped for media applications, as known in the art. The authoring system 12 is used to select and arrange the elements of the media program as desired by the program directors. Using the authoring system, the director creates the desired media program, which is typically output as a digital master tape in a high-definition format. Preferably, the output is compatible with an established standard, such as DVD-Video.

The media program becomes input for encoder 13, which is used to encode and optionally to encrypt the media program as known in the art, in preparation for writing to the digital media 14. Like authoring system 12, encoder 13 may comprise a general purpose computer running commercially available encoding software. Encoding may be done in various formats. For current DVD applications, the preferred format is MPEG-2, although other formats, such as MPEG-1, MPEG-2 Progressive Profile, H.263, or MPEG-4 may be used. Likewise, the digital media 14 may be of various forms. Presently, a common digital media is digital video disc (DVD). However, alternative media, such as digital tape, HD-DVD, or FMD (fluorescent multi-layer disc), may be used if desired. The encoded data is optionally encrypted.

The digital media may then be played using an appropriate media player. Typical media programs for movie videos require well in excess of 1 gigabyte of storage space, after being encoded, and are currently best suited for playing in dedicated media players such as DVD video players. Media players are currently available to read digital media formatted according various standards, including DVD-Video, DVD-Audio, and audio CD. The media player outputs a signal for a suitable output device 16, such as a television configured to accept a video signal according to a 525/60 (NTSC) or 625/50 (PAL/SECAM) standard, for viewing by a user. Alternative output devices may include a display device such as a CRT, passive matrix flat panel display, active matrix flat panel display, or CRT projection system, coupled to appropriate electronics for receiving any suitable video signal and processing the signal for creating a video display on the display device.

It should be appreciated that the digital media 14, media player 15, and output device 16 need not be physically near each other. In the case of a present-day DVD videodisc player, these elements are usually near each other. However, these elements may be separated by great distances if connected by a signal of sufficient bandwidth. For example, the digital media may be located at a remote site, and the encoded media program may be streamed to a media player at the user's location. In the alternative, both the media player and the digital media may be located remotely, and the video signal streamed or transmitted to the output device at the user's location. In the latter case, the user communicates with the media player via a remote connection.

Figure 2:
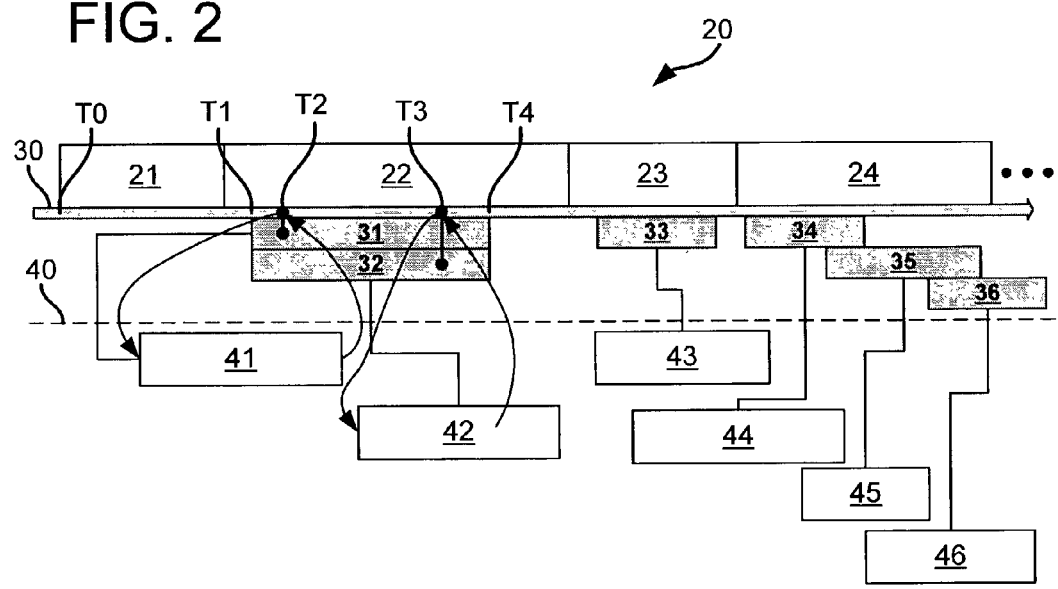
FIG. 2 is a diagram illustrating logical relationships between elements of a media program with selectable sub-segments.

FIG. 2 is a diagram illustrating logical relationships between elements of a media program 20 with selectable sub-segments 41-46 (six of many shown). The particular arrangement shown in FIG. 2 is exemplary, and it should be appreciated that an unlimited number of alternative arrangements may be provided that will conform to the logical relationships illustrated by the example. A primary program consists of a sequence of segments 21-24 (four of many shown). The sequence of the primary program segments 21-24 defines a timeline 30, running from left to right in FIG. 2. A time T0 on the timeline coincides with the initiation of the first primary program segment 21. Program time may be determined as known in the art. Preferably, the primary program segments are inherently chronologically determinative, so that increments of time along timeline 30 can conveniently be determined by counting bits from T0. A current bit position is preferably retained in a register, and can readily be converted to current program time along timeline 30.

Dashed line 40 denotes an imaginary line between visible elements of the primary program and the sub-segments, which conceptually reside in a sort of subspace below the primary program. The visible elements of the primary program comprise the segments 21-24 and links 31-36 (six of many shown). Segments 21-24 and links 31-36 are tied to the timeline, that is, appear on the output device (video screen) for predetermined intervals. One, and only one segment of primary program segments 21-24 can appear (be played) at any particular time. Segment 21 begins playing at time T0 and plays exclusively until segment 22 is initiated, and so forth.

In comparison, any number of links may appear (be played) simultaneously. For example, links 31 and 32 appear at the same time and for the same interval. Link 33 appears by itself, and links 34-36 appear for overlapping intervals. Links may be provided for any desired interval, and links with non-overlapping intervals may be grouped together by track. For example, links 31, 33, and 34 may be arranged in a first track; links 32 and 35 may be arranged in a second track; and link 36 may be arranged in a third track. These tracks are conceptual, and do not require creation of physical tracks. Each link is associated with a single sub-segment; however, a sub-segment may be associated with more than one link. For example, sub-segment 41 is associated with link 31, sub-segment 42 with link 32, and so forth.

Each link is preferably displayed in the form of a textual prompt. During the editing process that defines the sub-segments, and editor writes a descriptive prompt for each sub-segment that is displayed as, or as part of, the link. That is, the editor may provide any desired description. Optionally, the run-time of the sub-segment may be included as part of the textual description. For example, the descriptions of two simultaneous links may read:

View this scene from the perspective of Mary, Ted's girlfriend. 3:02

Dr. Simon discusses communication problems in relationships. 1:42

In the foregoing examples, "3:02" and "1:42" are the run times of the respective sub-segments, in minutes and seconds, and the descriptive text is self-explanatory.

Association between a link and a sub-segment may be accomplished in any manner compatible with the applicable media standard. Unlike hyperlinks in HTML documents, links in a self-contained media program need not include address information for the linked information. Instead, because the links are determined by the program time, association may be accomplished by determining the current program time and track of each link. For example, during the interval that link 33 appears in the primary program, it can be determined positively that sub-segment 43 is the associated sub-segment, merely by determining the program time, without any additional information.

However, when plural links appear simultaneously, such as during the interval between time T1 and time T4, additional information is needed. For such cases, a track table can be used to determine the association. The predetermined track table may provide that the link on track one (where link 31 appears) during the interval between T1 and T4 is associated with sub-segment 41; and the link on track two (where link 32 is located) during the same interval is associated with sub-segment 42. In other words, association of sub-segments may be determined from parallel timelines of each track. Timelined track-based methods may be preferable for ease of implementation within a DVD-Video standard environment. However, other association methods, including addressing, may be preferred for other environments.

During the interval that a link appears, a link may be activated at the option of the user. Preferably, links are activated by accessing an existing command function of the media player, such as by pressing a button on a media player remote control device. However, when only one link appears, it may be automatically activated. When a link is activated, a user may view the associated sub-segment by accessing a second command function of the media player, such as by pressing a second button on the remote control device. For example, at time T2, while link 31 is activated, a user selects the appropriate command for viewing the sub-segment 41. Sub-segment 41 is then played from beginning to end, while the value of T2 is stored in a memory of the media player. When sub-segment 41 is finished, the media player resumes playing the primary program at time T2 in segment 22. The user may then activate a second link 32 and command play of sub-segment 42 at a later time T3. As indicated by the position of the return arrow from sub-segment 42, the user preferably can terminate the sub-segment before it has completed play and return to the primary program at T3. Thus, a user is provided with an option to view any of the sub-segments 41-46 during allotted intervals.

Figure 3:
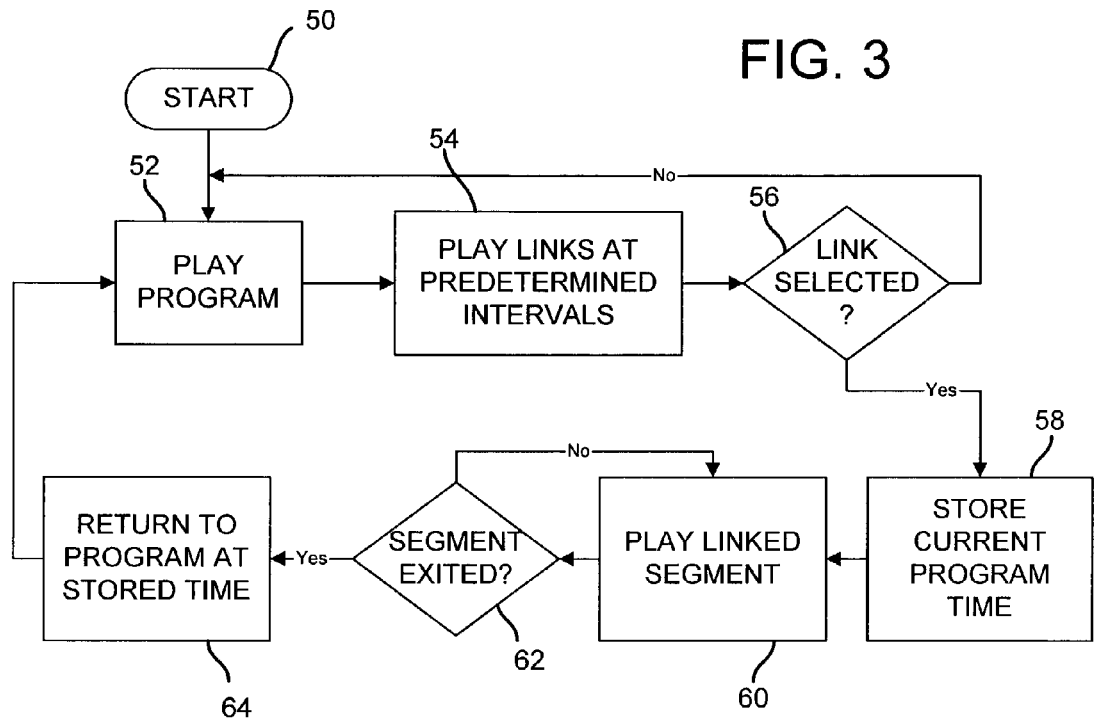
FIG. 3 is a flow chart showing a method for playing a media program with selectable sub-segments.

FIG. 3 is a flow chart showing a method 50 for playing a media program with selectable sub-segments. At step 52, a primary program of the media program is played in a media player. Play may begin at any program time selected by the user, and program control functions according to the prior art, such as fast-forward, reverse, pause, etc., are preferably fully enabled. At step 54, links are visibly displayed and/or audibly played at selected, predetermined intervals. Preferably, the links are arranged in at least two logical tracks, so that at least two links can be simultaneously displayed at selected intervals. Any displayed link may be activated by a user, or in the case of a single displayed link, activated automatically. As indicated at step 56, play is continued until an activated link is selected.

Both activation and selection of links may be accomplished by using a remote control device connected to the media player. The media program may be configured so that selection occurs automatically once a link is activated by a user, but it is generally preferable to have activation and selection separated. Advantageously, separate operations permits a user to activate links in turn, i.e., to toggle between links, without causing an unwanted sub-segment to play.

When a link is selected, the current primary program time, as determined, for example, by a bit position, is stored in a memory of the media player, and play of the primary program is interrupted. A sub-segment associated with the selected link is then played at step 60. As indicated at step 62, play of the sub-segment continues until it is exited. Preferably, a sub-segment may be exited at any time at the selection of the user, or the user may permit the sub-segment to play to completion. After the sub-segment is exited, the stored program time is retrieved from memory and the primary program resumes playing from the point where it was last interrupted.

Links may be implemented in the media program in various ways. According to an embodiment of the invention, links are implemented using hard encoded subtitles according to the DVD-Video standard. Hard encoded subtitles are DVD subpictures, which are full-screen graphical overlays. According to the DVD-Video standard, up to 32 subpicture tracks can be turned on to show text or graphics overlaid on the video frame. Accordingly, using the subpicture track, up to 32 independent links may be simultaneously displayed, and any number of links may be controlled using the 32 independent tracks. For most applications, fewer than 32 simultaneous links are preferred. In some embodiments, a maximum of two or three simultaneously displayed links is used, to avoid over-stimulating viewers with too many choices. In general, two or three tracks are usually sufficient for control of the links. According to the DVD-Video standard, each track supports full-screen, run-length-encoded bitmaps with two bits per pixel, giving four color values and four transparency values, selected from palettes of 16 colors and 16 transparency levels, respectively. Subpicture display command sequences can be used to create effects such as scroll, move, color/highlight, and fade. The maximum subpicture data rate is 3.36 Mbps, with a maximum size per frame of 53220 bytes. One skilled in the art will recognize that within these parameters, a large variety of video effects are possible.

Figure 4:
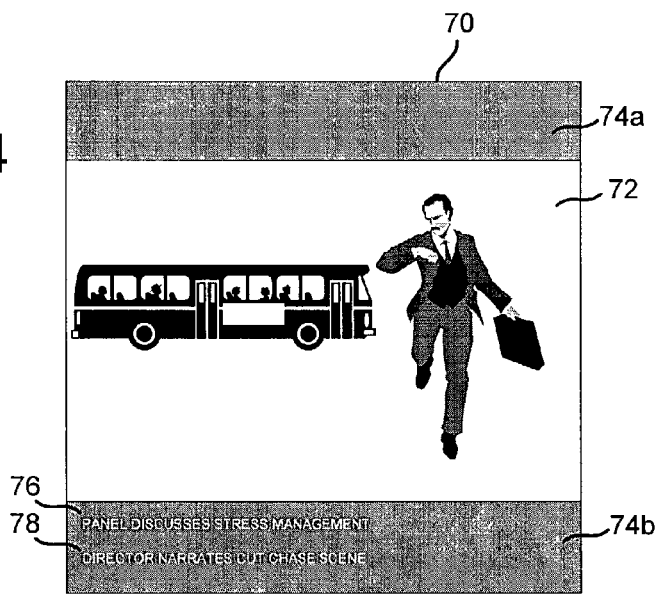
FIG. 4 is an exemplary screen shot taken during play of a media program according to the invention.

Preferably, each link contains information about the specific sub-segment to which it is associated. In particular, each link may provide a textual description of its linked sub-segment. The text of links may be displayed in a complex or sophisticated fashion, such as by being incorporated into a moving graphic or animated text. In some embodiments, it is preferable to use a relatively simple display mode, such as static text, for compatibility with the greatest number of media players. FIG. 4 shows a screen shot 70 according to an embodiment of the invention, wherein each link is displayed as a static text string 76, 78 appearing in a black bar (matte) 74a, 74b of a letterbox format display. Such mattes are used for display of high-aspect ratio (such as 1.85) formatted video 72 in a low aspect ratio (such as 1.33) video screen. Each text string (link) 76, 78 preferably serves to identify the content of the sub-segment that may be accessed using the link. Additionally, the text may indicate the run-time of the sub-segment, or provide any information about the sub-segment that is of interest for the particular application. The media program is configured so that while the text strings 76, 78 are displayed using separate subpicture tracks, a user may highlight (change the color or appearance of) any of the displayed text strings using command buttons of the media player. For example, the media program may be configured so that pressing any arrow keys on the remote control of a DVD player causes a highlight to toggle between the displayed links. While the desired link is highlighted, an associated sub-segment may be accessed by pressing a second button, such as an "enter" key. That is, performing a designated operation while a link is highlighted causes the media program to immediately branch to a sub-segment associated with the highlighted link.

In an embodiment of the invention, all of the links can be hidden, redisplayed, and/or inactivated and reactivated by the user during playing of the primary program. In other words, a user may turn access to the sub-segments and the display of their links on or off at will. Limitations of the DVD-Video standard and/or its implementation in particular media players may sometimes create difficulties with media programs according to this embodiment. To avoid such difficulties, a different approach is used in another embodiment of the invention. According to the second embodiment, two versions of the primary program are provided on a media disk: one version without the selectable sub-segments, and one version with the selectable sub-segments. Users who do not wish to view the primary program with the associated sub-segments may merely select the version without selectable sub-segments. According to yet another embodiment of the invention, users are provided with an option to view the sub-segments without viewing the primary program, either by playing the sub-segments in a predetermined order, by selecting specific sub-segments off of a menu or list, or by some combination of the foregoing.

In general according to the foregoing, in an embodiment of the invention a DVD video disc is provided containing encoded audio-visual information according to an accepted standard, such as DVD-Video. The encoded information comprises a primary program, a plurality of independent sub-segments, and a plurality of links in the primary program. Each of the links is associated with an individual one of the sub-segments and is configured to be played during a predetermined interval of the primary program. The encoded information is configured so that, when it is played in a suitable media player, each of the sub-segments is independently and selectively accessible during its associated predetermined interval of the primary program. Access to the sub-segments is by a user-controlled execution of a command function on the video player while a link associated with a sub-segment is being played. The encoded information is further configured so that, when any particular sub-segment is selected for access, the primary program is interrupted by the selected sub-segment at a point of interruption; and when the selected sub-segment is terminated, the primary program resumes play at the point of interruption. Preferably, the encoded information is configured so that more than one link may be played at any time during the primary program. One skilled in the art may create a media disc according to the invention in various ways, including but not limited to using subtitle functions within a DVD-Video or other standard.

Having thus described a preferred embodiment of a media program with selectable sub-segments, it should be apparent to those skilled in the art that certain advantages of the within system have been achieved. It should also be appreciated that various modifications, adaptations, and alternative embodiments thereof may be made within the scope and spirit of the present invention. For example, a method and system for implementation with the DVD-Video standard has been illustrated, but it should be apparent that the inventive concepts described above would be equally applicable to other media standards. The invention is further defined by the following claims.

What is claimed is:

1. A media player for playing a media program from a recording medium, the media program comprising:
   a primary program configured for streaming play on the media player, the primary program divisible into a continuous sequence of segments defining a timeline;
   a plurality of sub-segments encoded on the computer-readable medium with the primary program and not included in the primary program, each of the plurality of sub-segments configured for streaming play on the media player at times to be selected by the user; and
   a plurality of links in the primary program, each link configured to be played for a predetermined period of the timeline and not at other periods of the timeline; wherein the media program is configured to cause the media player to interrupt the primary program and play a predetermined one of the plurality of sub-segments when a predetermined interruption command of the media player is activated by the user while a link associated with the predetermined one of the plurality of sub-segments is being played.

2. The media player of claim 1, wherein at least two of the plurality of links are configured to be played simultaneously during the primary program, each of the at least two links associated with a different one of the plurality of sub-segments.

3. The media player of claim 2, wherein the media player is further configured to cause the media player to highlight a selected one of the at least two links when a predetermined selection command of the media player is activated by the user while the at least two links are being played.

4. The media player of claim 3, wherein the media player is further configured to cause the media player to interrupt the primary program and play one of the plurality of sub-segments associated with the selected one of the at least two links when the predetermined interruption command of the media player is activated by the user while the at least two links are being played.

5. The media player of claim 1, wherein the media player is further configured to cause the media player to resume playing the primary program starting at a timeline point where the primary program was interrupted, after the predetermined one of the plurality of sub-segments is no longer being played.

6. The media player of claim 1, wherein each of the plurality of links includes information descriptive of a sub-segment associated with the each link.

7. The media player of claim 6, wherein the information is in the form of text.

8. The media player of claim 7, wherein at least selected ones of the plurality of links are configured to appear as static text strings.

9. The media player of claim 1, wherein at least selected ones of the plurality of links are configured to appear in a black bar of a letterbox display.

10. The media player of claim 1, wherein the plurality of links are configured on a plurality of logical tracks parallel to the timeline.

11. The media player of claim 1, further comprising a track table configured for determining an association between a link and a sub-segment for portions of the media program in which two links appear simultaneously.

12. The media player of claim 1, wherein each of the plurality of links comprises information for associating the each link with one of the plurality of sub-segments.

13. The media player of claim 1, wherein the media player is encoded on a DVD.

14. The media player of claim 1, wherein the media player is encoded according a standard selected from the group consisting of MPEG-2, MPEG-1, MPEG-2 progressive profile, H.263, or MPEG-4.

15. A method for playing a media program on a media player to produce an audio-visual stream, the method comprising:
   playing a primary program encoded on a computer-readable medium on the media player to produce a continuous dynamic output divisible into a continuous sequence of segments defining a timeline;
   playing a plurality of links during the first playing step, each link played for a predetermined period of the timeline and not at other periods of the timeline; and
   activating a predetermined interruption command while one of the plurality of links is being played, thereby interrupting the primary program and playing a predetermined one of a plurality of sub-segments encoded on the computer-readable medium and associated with the one of the plurality of links, the one of the plurality of sub-segments producing a continuous dynamic output from the media player in place of output from the primary program.

16. The method of claim 15, wherein playing the plurality of links further comprises playing at least two of the plurality of links simultaneously during the primary program, each of the at least two links associated with a different one of the plurality of sub-segments.

17. The method of claim 16, wherein the activating step further comprises activating a predetermined selection command of the media player while the at least two links are being played to highlight a selected one of the at least two links, whereby the predetermined one of the plurality of sub-segments is one associated with the selected one of the at least two links.

18. The method of claim 15, further comprising resuming play of the primary program at a timeline point where the primary program was interrupted by the activating step, after the predetermined one of the plurality of sub-segments is no longer being played.

19. The method of claim 15, wherein playing the plurality of links further comprises playing each of the plurality of links including information descriptive of a sub-segment associated with the each link.

20. The method of claim 19, wherein playing the plurality of links further comprises playing each of the plurality of links including information in the form of text.

21. The method of claim 20, wherein playing the plurality of links further comprises playing each of the plurality of links configured to appear as static text strings.

22. The method of claim 15, wherein playing the plurality of links further comprises playing at least selected ones of the plurality of links to appear in a black bar of a letterbox display.

23. The method of claim 15, wherein the first playing step further comprises reading the media program from a media disc.

24. The method of claim 15, wherein the first playing step further comprises decoding the media program according to a standard selected from the group consisting of MPEG-2, MPEG-1, MPEG-2 progressive profile, H.263, or MPEG-4.

25. A method for producing a media program for play on a media player, the method comprising:
   defining a primary program comprising a continuous sequence of discrete segments of digital data configured to produce a continuous dynamic output from a media player, thereby defining a timeline;
   defining a plurality of links compatible with the primary program;
   configuring each of the plurality of links to play during a determined period of the timeline and not during other periods of the timeline;
   defining a plurality of sub-segments comprising other selected ones of the discrete segments, each of the sub-segments configured to produce a continuous dynamic output from the media player;
   associating the plurality of links with the plurality of sub-segments;
   defining instructions for instructing a media player to respond to a predetermined interruption command by interrupting the primary program and playing one of the plurality of sub-segments that is associated with one of the plurality of links that is being played while the predetermined interruption command is activated in place of the primary program; and
   combining the primary program, the plurality of links, the plurality of sub-segments, and the instructions for encoding together as a combined media program on a unitary medium.

26. The method of claim 25, wherein the configuring step further comprises configuring at least two of the plurality of links to play simultaneously during the primary program, each of the at least two links associated with a different one of the plurality of independent sub-segments.

27. The method of claim 26, wherein the defining instructions step further comprises defining the instructions for the media player to respond to a predetermined selection command that is activated when the at least two of the plurality of links are being played by highlighting one of the at least two of the plurality of links.

28. The method of claim 25, wherein the defining instructions step further comprises defining the instructions for the media player to resume play of the primary program at a timeline point where the primary program is interrupted for play of the one of the plurality of sub-segments, after the predetermined one of the plurality of sub-segments is no longer being played.

29. The method of claim 25, wherein the defining the plurality of links step further comprises defining each of the plurality of links including information descriptive of a sub-segment associated with the each link.

30. The method of claim 25, wherein the defining the plurality of links step further comprises defining each of the plurality of links including information in the form of text.

31. The method of claim 30, wherein the defining the plurality of links step further comprises defining each of the plurality of links to appear as static text strings.

32. The method of claim 25, wherein the defining the plurality of links step further comprises defining at least selected ones of the plurality of links to appear in a black bar of a letterbox display.

33. The method of claim 25, farther comprising writing the media program onto a media selected from the group consisting of optical media or magnetic media.

34. The method of claim 33, wherein the writing step farther comprises writing the media program onto a DYD.

35. The method of claim 25, further comprising encoding the media program according to a standard selected from the group consisting of MPEG-2, MPEG-1, MPEG-2 progressive profile, H.263, or MPEG-4.

* * * * *

UNITED STATES PATENT AND TRADEMARK OFFICE
CERTIFICATE OF CORRECTION

| | | |
|---|---|---|
| PATENT NO. | : 7,450,826 B2 | Page 1 of 1 |
| APPLICATION NO. | : 10/213474 | |
| DATED | : November 11, 2008 | |
| INVENTOR(S) | : Matt Lasora et al. | |

It is certified that error appears in the above-identified patent and that said Letters Patent is hereby corrected as shown below:

Col. 12, Claim 33, line 1, delete "farther" and insert -- further --

Col. 12, Claim 34, line 2, delete "farther" and insert -- further --

Signed and Sealed this

Twenty-seventh Day of January, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,450,826 B2                                    Page 1 of 1
APPLICATION NO.  : 10/213474
DATED            : November 11, 2008
INVENTOR(S)      : Matt Lasora et al.

It is certified that error appears in the above-identified patent and that said Letters Patent is hereby corrected as shown below:

Col. 12, Claim 33, line 44, delete "farther" and insert -- further --

Col. 12, Claim 34, line 48, delete "farther" and insert -- further --

This certificate supersedes the Certificate of Correction issued January 27, 2009.

Signed and Sealed this

Seventeenth Day of February, 2009

JOHN DOLL
*Acting Director of the United States Patent and Trademark Office*